United States Patent
Albartus et al.

(10) Patent No.: US 10,550,567 B2
(45) Date of Patent: Feb. 4, 2020

(54) FASTENING RAIL AND CONCRETE ELEMENT HAVING A FASTENING RAIL

(71) Applicant: HALFEN GmbH, Langenfeld (DE)

(72) Inventors: Dirk Albartus, Bochum (DE); Vadim Saibel, Ratingen (DE); Andrea Magiera, Erkrath (DE); Kerstin Axt, Haan (DE); Joerg Geus, Frechen (DE); Dieter Plamper-Hellwig, Haan (DE); Frank Haeusler, Duesseldorf (DE); Bastian Juschkat, Monheim (DE); Thomas Kalthoff, Muelheim (DE)

(73) Assignee: HALFEN GmbH, Langenfeld (DE)

( * ) Notice: Subject to any disclaimer, the term of this patent is extended or adjusted under 35 U.S.C. 154(b) by 0 days.

(21) Appl. No.: 15/974,498

(22) Filed: May 8, 2018

(65) Prior Publication Data

US 2018/0320365 A1   Nov. 8, 2018

(30) Foreign Application Priority Data

May 8, 2017  (EP) .................................. 17000788

(51) Int. Cl.
  *E04B 1/41*   (2006.01)
  *F16B 2/00*   (2006.01)
  *F16B 37/04*  (2006.01)

(52) U.S. Cl.
  CPC ............ *E04B 1/4107* (2013.01); *F16B 2/005* (2013.01); *E04B 1/4128* (2013.01); *E04B 1/4135* (2013.01); *F16B 37/045* (2013.01)

(58) Field of Classification Search
  CPC .... E04B 1/4107; E04B 1/4135; E04B 1/4128; F16B 2/005; F16B 37/045

USPC .................................. 52/704, 707, 710, 711
  See application file for complete search history.

(56) References Cited

U.S. PATENT DOCUMENTS

| | | | | |
|---|---|---|---|---|
| 1,764,772 A | * | 6/1930 | Bitney | ................. E04B 1/4107 52/710 |
| 1,769,498 A | * | 7/1930 | Downing | .............. E04B 1/4107 52/709 |
| 1,929,835 A | * | 10/1933 | Awbrey | ................ E04B 1/4107 52/709 |

(Continued)

FOREIGN PATENT DOCUMENTS

| | | |
|---|---|---|
| DE | 19725882 A1 | 12/1998 |
| DE | 10014977 A1 | 9/2001 |
| EP | 1693525 * | 2/2006 |

*Primary Examiner* — Brian E Glessner
*Assistant Examiner* — Adam G Barlow
(74) *Attorney, Agent, or Firm* — Walter Ottesen, P.A.

(57) ABSTRACT

A fastening rail for embedding into a concrete element has one rail back, two rail lips and two rail longitudinal sides disposed opposite one another. The rail lips delimit a slot between them. The fastening rail is realized in an anchorless manner and forms at least one undercut from the rail back in the direction of the outside of the rail lips. To improve anchoring in concrete, the rail back has profiling on its outside which is remote from the rail lips. The fastening rail is advantageously embedded into a concrete element such that the outside of the rail lips lies flush with the surface of the concrete element. A method for making a fastening rail includes producing a profiling in at least one central region of a top side of a metal plate and reshaping the metal plate to form the rail back, rail longitudinal sides and rail lips.

13 Claims, 3 Drawing Sheets

(56) References Cited

U.S. PATENT DOCUMENTS

| | | | | |
|---|---|---|---|---|
| 2,780,936 A * | 2/1957 | Hillberg | E04B 1/4107 | 52/710 |
| 2,898,758 A * | 8/1959 | Henrickson | E04B 1/4107 | 52/710 |
| 2,909,054 A * | 10/1959 | Phillips | E04B 1/4107 | 52/710 |
| 2,967,692 A * | 1/1961 | Wolar | E04B 1/4107 | 248/343 |
| 3,005,292 A * | 10/1961 | Reiland | E04B 1/4107 | 52/99 |
| 3,059,589 A * | 10/1962 | Schreyer | B65G 21/00 | 104/111 |
| 3,156,450 A * | 11/1964 | Wenzel | E04B 1/4107 | 52/707 |
| 3,364,641 A * | 1/1968 | Brenneman | E04B 1/4107 | 52/573.1 |
| 3,375,623 A * | 4/1968 | Buhler | E04B 1/4107 | 52/97 |
| 4,040,228 A * | 8/1977 | Skubic | E04B 1/4107 | 52/710 |
| 4,241,490 A * | 12/1980 | Edwards | E04C 5/165 | 29/459 |
| 4,313,697 A * | 2/1982 | Rozanc | E21D 20/025 | 405/259.6 |
| 4,532,740 A * | 8/1985 | Fricker | E04G 15/061 | 52/309.4 |
| 4,545,697 A * | 10/1985 | Verdenne | F16B 37/042 | 403/230 |
| 4,579,785 A * | 4/1986 | Karoubas | E04B 5/40 | 428/599 |
| 4,619,096 A * | 10/1986 | Lancelot, III | B21J 5/08 | 52/600 |
| 4,700,923 A * | 10/1987 | Lewis, Jr. | F16M 3/00 | 248/500 |
| 4,708,554 A * | 11/1987 | Howard | E04C 3/06 | 411/437 |
| 4,878,640 A * | 11/1989 | Fricker | E04B 1/4107 | 248/297.21 |
| 5,729,951 A * | 3/1998 | Frohlich | B21K 25/00 | 52/698 |
| 6,698,980 B2 * | 3/2004 | Mongrain | E21D 20/02 | 405/259.5 |
| 6,817,156 B2 * | 11/2004 | Mok | E04B 1/4107 | 52/677 |
| 6,886,384 B2 * | 5/2005 | Gray | B21H 3/022 | 405/259.1 |
| 7,147,404 B2 * | 12/2006 | Spearing | E21D 11/006 | 405/259.5 |
| 7,624,556 B2 * | 12/2009 | Plooksawasdi | E04C 5/03 | 52/849 |
| 7,784,240 B2 * | 8/2010 | Miller | E04F 19/02 | 256/65.01 |
| 7,922,130 B2 * | 4/2011 | Hawkins | F16L 3/00 | 248/346.01 |
| 9,551,150 B2 * | 1/2017 | Wood | E21D 21/004 | |
| 9,803,354 B1 * | 10/2017 | Francies, III | E04B 1/4107 | |
| 2003/0012596 A1 * | 1/2003 | Copping | E04C 5/165 | 403/313 |
| 2003/0217521 A1 * | 11/2003 | Richardson | E04B 1/4107 | 52/92.2 |
| 2007/0039281 A1 * | 2/2007 | Zambelli | E04B 1/4107 | 52/710 |
| 2009/0003960 A1 * | 1/2009 | Lin | F16B 39/24 | 411/161 |
| 2010/0101175 A1 * | 4/2010 | Hohmann | E04B 1/4107 | 52/698 |
| 2011/0283654 A1 * | 11/2011 | Pol | B21D 28/24 | 52/710 |
| 2013/0047541 A1 * | 2/2013 | Mayer | E04B 9/247 | 52/506.05 |
| 2013/0145720 A1 * | 6/2013 | Heudorfer | E04B 1/4107 | 52/710 |
| 2014/0047700 A1 * | 2/2014 | Lohr | F16B 39/24 | 29/525.12 |
| 2014/0250825 A1 * | 9/2014 | Richardson | E04B 1/4107 | 52/710 |
| 2015/0240478 A1 * | 8/2015 | Brunhuber | E04B 1/4107 | 52/710 |
| 2016/0305114 A1 * | 10/2016 | Albartus | E04B 1/4107 | |

* cited by examiner

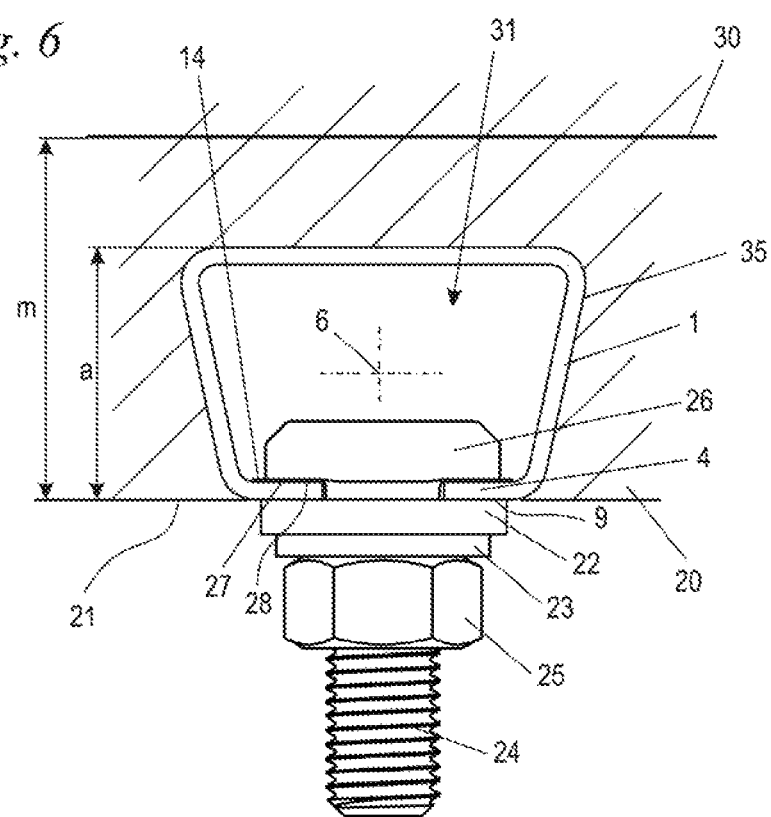

FASTENING RAIL AND CONCRETE ELEMENT HAVING A FASTENING RAIL

CROSS REFERENCE TO RELATED APPLICATION

This application claims priority of European patent application no. 17 000 788.4, filed May 8, 2017, the entire content of which is incorporated herein by reference.

FIELD OF THE INVENTION

The invention relates to a fastening rail for embedding into a concrete element, to a concrete element having a fastening rail and to a method for producing a fastening rail.

BACKGROUND OF THE INVENTION

DE 100 14 977 A1 discloses a fastening rail, namely a profile rail to be encased in concrete in a concrete element. In order to improve the anchoring of the rail in the surrounding concrete, the rail longitudinal sides of the profile rail have means for the positive locking connection to the concrete element. For this purpose, the rail can be realized with an undercut on its rail longitudinal sides.

SUMMARY OF THE INVENTION

It is an object of the invention to create a fastening rail for embedding into a concrete element of the generic type which enables improved fixing in the surrounding concrete. A further object of the invention is to provide a concrete element having a fastening rail where high forces are able to be introduced into the concrete via the fastening rail. A further object of the invention is to provide a method for producing a fastening rail.

The object can, for example, be achieved via a fastening rail, wherein the fastening rail has one rail back, two rail longitudinal sides which are situated opposite one another and extend in a rail longitudinal direction and two rail lips, wherein the rail lips extend in each case on the side of the rail longitudinal sides which is remote from the rail back and project toward one another from the rail longitudinal sides and delimit a slot between them, wherein the rail lips have an outside which is remote from the rail back, wherein the fastening rail is realized in an anchorless manner and wherein the fastening rail forms at least one undercut from the rail back in the direction of the outside of the rail lips, wherein the fastening rail has an outside surface which is formed by the outside of the rail back, which is remote from the rail lips, and the outsides of the rail longitudinal sides and which is provided for contact with the concrete of the concrete element, wherein the outside is provided at least in part with a profiling.

With reference to the concrete element, the object is achieved by a concrete element having a fastening rail, wherein the fastening rail has one rail back, two rail longitudinal sides which are situated opposite one another and extend in a rail longitudinal direction, and two rail lips, wherein the rail lips extend in each case on the side of the rail longitudinal sides which is remote from the rail back and project toward one another from the rail longitudinal sides and delimit a slot between them, wherein the rail lips have an outside which is remote from the rail back, wherein the fastening rail is realized in an anchorless manner and wherein the fastening rail forms at least one undercut from the rail back in the direction of the outside of the rail lips, wherein the fastening rail has an outside surface which is formed by the outside of the rail back, which is remote from the rail lips, and the outsides of the rail longitudinal sides and which is provided for contact with the concrete of the concrete element, wherein the outside surface is provided at least in part with a profiling, wherein the fastening rail is embedded into the concrete element and the outside of the rail lips lies flush with the surface of the concrete element.

With reference to the method for producing a fastening rail, the object is achieved by a method for producing a fastening rail from a metal plate, wherein the fastening rail has one rail back, two rail longitudinal sides, which are situated opposite one another and extend in a rail longitudinal direction, and two rail lips, wherein the rail lips extend in each case on the side of the rail longitudinal sides which is remote from the rail back and project toward one another from the rail longitudinal sides and delimit a slot between them, wherein the rail lips have an outside which is remote from the rail back, wherein the fastening rail is realized in an anchorless manner and wherein the fastening rail forms at least one undercut from the rail back in the direction of the outside of the rail lips, wherein the fastening rail has an outside surface which is formed by the outside of the rail back, which is remote from the rail lips, and the outsides of the rail longitudinal sides and which is provided for contact with the concrete of the concrete element, wherein the outside surface is provided at least in part with a profiling, wherein the method includes the steps of producing a profiling in at least one center region of a top side of the metal plate and re-shaping the metal plate for forming the rail back, rail longitudinal sides and rail lips of the fastening rail, wherein the rail back is formed at least in part by the center region of the metal plate.

In order to improve the anchoring of the fastening rail in the concrete element, it is provided that the outside surface of the fastening rail, which is provided for contact with the concrete of the concrete element, is provided at least in part with a profiling. The outsides of the rail lips are not provided for contact with the concrete of the concrete element and consequently do not form part of the outside surface. It has been shown that higher forces are transmissible in particular in the rail longitudinal direction as a result of the profiling of the outside surface. As a result of the undercut in the fastening rail, forces can be adsorbed well perpendicularly to the surface of the concrete element into which the fastening rail is embedded such that overall a high level of bearing capacity can be achieved on the rail back even without anchors. An undercut, in this case, means a widening on the outside of the fastening rail in the direction from the rail back to the rail lips. The undercut causes the fastening rail to be held in the surrounding concrete in a positive locking manner perpendicularly to the plane of the rail lips.

As a result of the fastening rail being realized in an anchorless manner, that is, not having any anchor on the rail back, the fastening rail can be installed independently of an armoring of the concrete element. Usual anchors project into the armoring of a concrete element such that the position of the fastening rails is to be matched to the position of the armoring. It has been shown that as a result of the combination between an at least partial profiling of the outside surface of the fastening rail, which is provided for contact with the concrete, and an undercut from the rail back in a direction of the outside of the rail lips, very good anchoring is achieved such that it is possible to dispense with anchors on the rail back and, nevertheless, high forces are able to be introduced into the fastening rail.

The fastening rail according to the invention is also usable in very thin components. On account of the anchorless configuration, the fastening rail is also able to be fully embedded into comparatively thin concrete elements such that the fastening rail lies flush with the top side of the concrete element. The outside surface is advantageously provided with the profiling over the entire length of the fastening rail and in particular over a large part, in a preferred manner over the entire periphery. As a result, the load transmission into the concrete element is effected uniformly over the entire length of the fastening rail and not, as in the case of conventional anchors which are arranged at defined spacings, only point by point.

The profiling can be effected in a rolling process, in particular in a cold rolling process. Additional production steps, such as, for example, a punching operation as in the case of introducing breakthroughs in the rail back and/or the rail longitudinal sides, are not necessary. If cracks are formed in the concrete, the load capacity is not reduced significantly as the fastening rail is held in the concrete element over its entire length by means of the profiling and the undercut. The profiling extends in an advantageous manner up to the end faces of the fastening rail which are aligned transversely to the rail longitudinal direction. As a result, comparatively high loads can also be introduced in the edge regions of the fastening rail, that is, at the ends of the fastening rail. The adherence to large distances between edges as in the case of fastening rails with anchors is not necessary. On account of the continuous profiling, the fastening rail is able to be cut and shortened in an arbitrary manner. The expenditure incurred for the storage of fixed lengths, as in the case of fastening rails with anchors, is consequently not incurred.

In an advantageous manner, the depth of the profiling is no more than 70% of the wall thickness of the fastening rail. In an advantageous configuration, the depth of the profiling is no more than 50%, in particular no more than 40% of the wall thickness of the fastening rail. A profiling with a comparatively small depth can be produced simply in a cold rolling process. It has been shown that good anchoring can be achieved in the surrounding concrete with a profiling depth of no more than 70%, in particular no more than 50% and advantageously no more than 40%. The profiling, in this case, does not include any breakthroughs. As a result, no punching process to generate breakthroughs is required in the production process. The production process is consequently simplified.

The profiling is advantageously formed by a plurality of indentations in the outside surface. The indentations are advantageously individual indentations with defined geometry which are spaced apart from one another. However, it can also be provided that the profiling is achieved by an irregular geometry, in particular by an increased roughness of the outside surface of the rail back. The inside surface of the rail back, which is remote from the outside surface, is advantageously realized as a planar surface without profiling. Consequently, no machining is necessary on the inside surface during production of the rail. In an advantageous manner, the profiling of the outside surface is not reproduced on the inside surface of the fastening rail. The inside surface is composed, in this case, of the inside of the rail back and the insides of the rail longitudinal sides.

The center-to-center distance between adjacent indentations is advantageously greater than the depth of the indentations. In a preferred configuration, the ratio of the center-to-center distance of adjacent indentations to the depth of the indentation is between 2 and 6. All the indentations advantageously have the same depth. However, indentations with different depths can also be advantageous. Where indentations have different depths, the depth of the indentations is the average depth of the indentations.

In a preferred manner, the rail back is provided with a profiling on its outside which is remote from the rail lips. In an advantageous configuration, the rail longitudinal sides are also provided with a profiling on their outsides. Good anchoring in the surrounding concrete can be achieved as a result of the profiling of the rail longitudinal sides and of the rail back. It can also be advantageous for only the rail longitudinal sides or only the rail back to carry a profiling on the outside. Partial profiling of the rail longitudinal sides and/or the rail back can also be advantageous. The profiling on the outsides of the rail longitudinal sides, in this case, improves both the force transmission in the rail longitudinal direction and the force transmission perpendicularly to the top side of the concrete element and, as a result, supports the effect of the undercut.

In a preferred configuration, the profiling of the fastening rail extends continuously over the outside of the rail back and the outsides of the rail longitudinal sides. In an advantageous manner, no profiling is provided on the outside of the rail lips such that the fastening rail has an attractive, smooth exterior in the installed state. However, it can also be advantageous also to provide the outsides of the rail lips with a profiling such that the force, which is transmissible from a fastening screw to the fastening rail, is also increased in the rail longitudinal direction. The profiling on the outsides of the rail lips, in this case, can be realized in an identical manner to the profiling of the outsides of the rail back and of the outsides of the rail longitudinal sides. However, a different profiling of the outsides of the rail lips can also be advantageous.

In an advantageous manner, the fastening rail carries a second profiling on the insides of the rail lips. The fastening rail is advantageously provided for the purpose of introducing a fastening element, in particular the head of a fastening screw, into the rail interior and there pressing it against the insides of the rail lips. This is effected in an advantageous manner by means of a nut which is screwed on the outside of the fastening means, in particular of the screw. The second profiling increases the friction on the inside of the rail lips of the fastening rail such that the force which is transmissible from the fastening element to the fastening rail, in particular the force which is transmissible in the rail longitudinal direction, is also significantly increased. The profiling on the insides of the rail lips can be effected by means of toothing, roughening or surface structuring, for example in the manner of knurling or the like.

The undercut is advantageously formed by at least one rail longitudinal side. In a preferred configuration, the undercut is formed as a result of the width of the fastening rail, which is measured parallel to the outside of the rail lips and perpendicularly to the rail longitudinal direction, decreasing in at least one portion from the rail back in the direction of the outside of the rail lips. As a result, no additional elements are required for forming the undercut. However, it can also be provided that additional elements, such as, for example, ribs, webs or the like which extend in the rail longitudinal direction, can be provided to form the undercut. In a particularly preferred configuration, the cross section of the fastening rail is approximately trapezoidal. The rail longitudinal sides are advantageously inclined toward one another, at least in the portion in which the undercut is formed, from the rail back in the direction of the rail lips.

The greatest width of the fastening rail in the portion in which the undercut is formed is advantageously at least 1.1 times, in particular at least 1.2 times the smallest width of the rail. The greatest width, in this case, is in particular less than 2 times, in particular less than 1.6 times the smallest width. In a preferred configuration, the smallest width of the fastening rail is provided adjacent to the rail lips and the greatest width adjacent to the rail back. As a result, approximately the entire height of the fastening rail is able to be utilized to form the undercut. In an advantageous manner, the width of the fastening rail decreases continuously from the rail back to the rail lips. The rail longitudinal sides, in this case, can extend in a straight manner or in a convexly or concavely curved manner. A different configuration of the rail longitudinal sides can also be advantageous.

The overall width of the fastening rail is advantageously between 1.4 times and 1.8 times the height of the fastening rail. With the rail lips and the rail back having a predefined width, a comparatively large portion with undercut can be formed due to the comparatively high height of the fastening rail, as a result of which good anchoring of the fastening rail is produced.

In an advantageous configuration, the fastening rail is formed by a one-piece bent metal plate. Additional elements such as, for example, anchors or the like are accordingly not provided on the fastening rail. The wall thickness of the fastening rail is advantageously comparatively large and is between 1.2 mm and 3.0 mm at least on the rail back. In a preferred manner, the wall thickness of the fastening rail is approximately constant apart from the indentations or elevations which are formed by the profiling. The wall thickness of the fastening rail is advantageously between 1.2 mm and 3.0 mm on the rail longitudinal sides and on the rail lips. The ratio of the wall thickness of the fastening rail to the overall width of the fastening rail is advantageously between 0.03 and 0.08. The wall thickness is accordingly comparatively large compared to the overall width of the fastening rail. The ratio of wall thickness to overall width for usual protective boxes or the like is in the order of thousandths. The wall thickness, that is, the metal plate thickness, is accordingly significantly smaller in the case of protective boxes or the like than in the case of the present fastening rail.

It is provided for a concrete element with a fastening rail that the fastening rail is embedded into the concrete element and that the outside of the rail lips lies flush with the surface of the concrete element. The fastening rail is accordingly encased in concrete in the concrete element and is held as a result in the concrete element. Additional anchors or fastening means for fixing the fastening rail in the concrete element are advantageously not provided. The concrete element has, in particular, armoring. The distance between the armoring and the surface of the concrete element, in this case, is advantageously greater than the height of the fastening rail. As a result, the fastening rail can be arranged and fixed in the concrete element independently of the armoring.

The fastening rail is advantageously produced in a rolling method, in particular in a cold rolling method. It is provided for a method for producing a fastening rail from a metal plate that a profiling is produced in at least one center region of a top side of the metal plate. Once the profiling has been produced, the profiled metal plate is re-shaped, in particular in a cold rolling process. When re-shaping the metal plate, the rail back, the rail longitudinal sides and the rail lips of the fastening rail are formed. The metal plate, in this case, is arranged such that the rail back is formed at least in part by the center region of the metal plate. The top side of the metal plate, in this case, forms the outside of the rail back of the fastening rail. The profiling is advantageously not produced in the cold rolling process during the re-shaping of the metal plate, but prior to the re-shaping of the metal plate. The metal plate is, in particular, strip stock which is fed already in the profiled state to the equipment for cold rolling.

In an advantageous manner, a second profiling is produced, prior to the re-shaping of the metal plate, in edge regions of the metal plate on an underside which is remote from the top side. The edge regions advantageously form the rail lips after the re-shaping process. The profiling on the top side of the metal plate and the second profiling on the underside can be produced, in this case, in the same method step or in an arbitrary sequence one after another.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
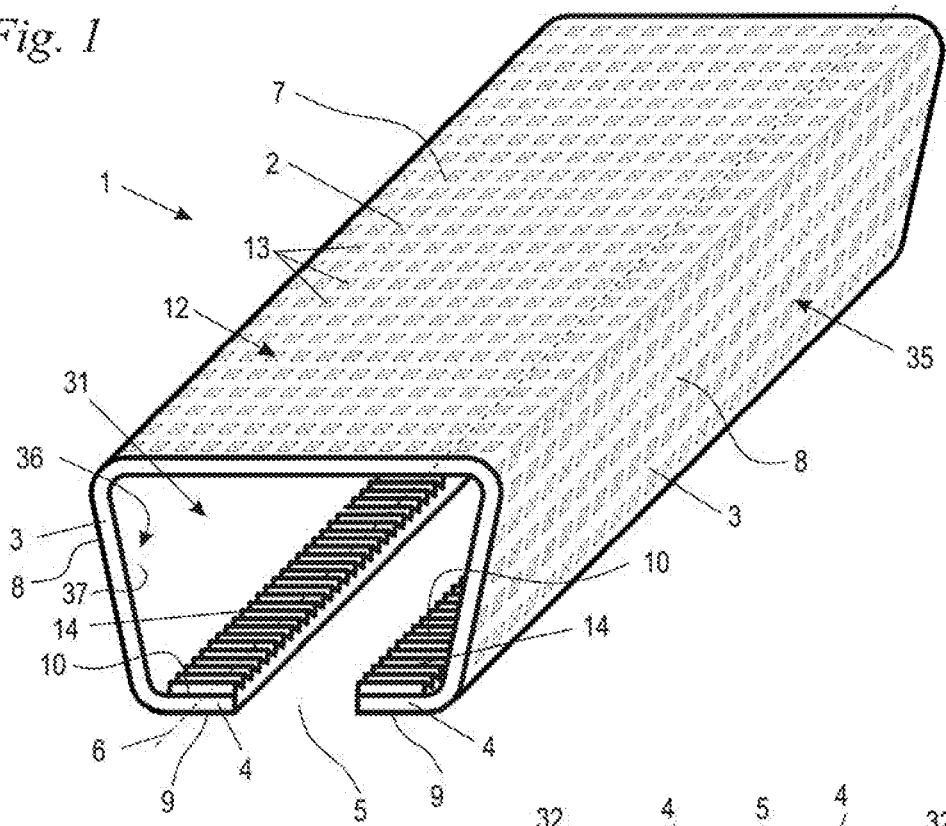
FIGS. 1 and 2 show perspective representations of a fastening rail.

FIG. 1 shows a perspective representation of a fastening rail 1 which is provided to be embedded into a concrete element. Objects such as tubes, pipes, facade anchors or the like can be fastened to the fastening rail 1 without bores and dowels having to be inserted into the concrete element. The fastening rail 1 has a rail interior 31 which is open to the surrounding area via a slot 5. A fastening means such as, for example, a screw bolt with a suitable head can be guided and screw-connected through the slot 5. The screw bolt is supported, in this case, on rail lips 4 which extend on both sides of the slot 5 and are advantageously arranged flush with the surface of the concrete element.

The fastening rail 1 has a rail back 2, to which rail longitudinal sides 3 connect on both sides. In the embodiment, the rail back 2 is realized in a planar manner and extends parallel to the rail lips 4 both in the rail longitudinal direction 6 and in the transverse direction of the fastening rail 1. However, a different, for example arched form of the rail back 2 can also be advantageous. The rail back 2 and the rail longitudinal sides 3 extend in a rail longitudinal direction 6. On the sides remote from the rail back 2, the rail lips 4, which define the slot 5 between them, connect to the rail longitudinal sides 3. In the embodiment, the cross section of the fastening rail 1 is approximately trapezoidal. However, a different cross section can also be advantageous. The rail back 2 and the rail longitudinal sides 3, just as the rail lips 4, are realized in a planar manner and are connected together by means of rounded edges. The roundings 32 and 33 (FIG. 2) of the edges are produced by the bending radius which can be produced in the production process.

The rail back 2 has an outside 7 which lies remote from the rail lips 4. As is also shown in FIG. 1, the rail longitudinal sides 3 have outsides 8. The rail back 2, the rail longitudinal sides 3 and the rail lips 4 define the rail interior 31. The outsides 8 of the rail longitudinal sides 3 are remote from the rail interior 31. The outside 7 of the rail back 2 and the outsides 8 of the rail longitudinal sides 3 form an outside surface 35. The outside surface 35 is provided for contact with the surrounding concrete in the installed state. In order to improve the anchoring in the surrounding concrete, the outside surface 35 carries a profiling 12. The profiling 12 is formed by a plurality of indentations 13. In the embodiment, the indentations 13 are arranged in a uniform manner and at constant spacings to one another in the rail longitudinal direction 6 and transversely to the rail longitudinal direction 6 such that a regular grid is produced. All the indentations 13 have the same geometry. The profiling 12 is arranged continuously over the entire outside 7 of the rail back 2 and the outsides 8 of the rail longitudinal sides 3 and extends in the rail longitudinal direction 6 up to end sides of the fastening rail 1 which extend transversely to the rail longitudinal direction 6.

The rail lips 4 have an outside 9 which lies remote from the rail interior 31. The rail lips 4 additionally have an inside 10 which faces the rail interior 31 and on which a second profiling 14 is arranged. In the embodiment, the second profiling 14 is realized as toothing. The second profiling 14 is formed by a plurality of teeth which are arranged consecutively in the rail longitudinal direction 6 and extend transversely to the rail longitudinal direction 6.

Figure 2:
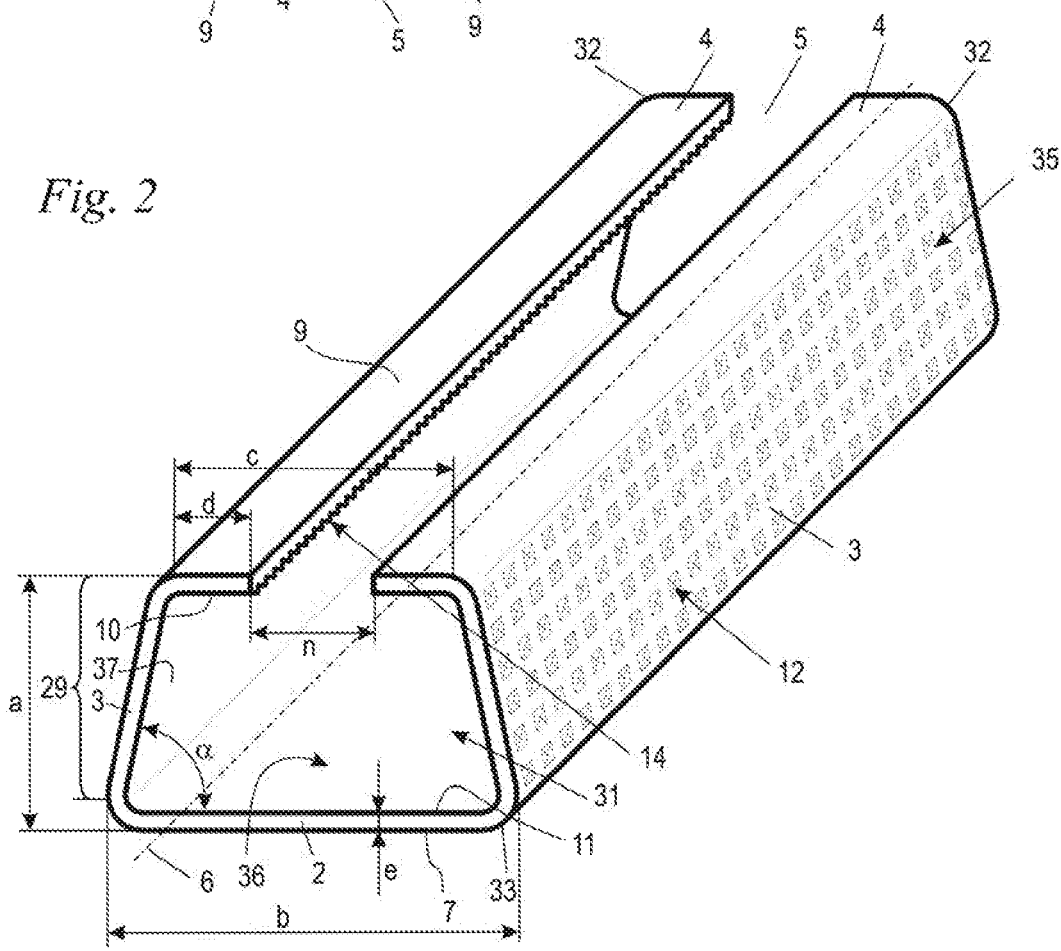

As shown in FIG. 2, the outside 9 of the rail lips 4 is free of profiling and is realized as a smooth, planar outside. The profiling 12 of the rail longitudinal sides 3 extends up to a rounding 32 at which the rail longitudinal sides 3 merge into the rail lips 4. However, a profiling can also be provided on the outsides 9 of the rail lips 4.

As is also shown in FIG. 2, the rail lips 4 have a width d which is measured transversely to the slot 5 and perpendicularly to the rail longitudinal direction 6. The slot 5 has a width n which is measured in the same direction. The fastening rail 1 has a width c, which is the smallest width of the fastening rail 1, on the rail lips 4. The width c corresponds to the sum of the widths d of both rail lips 4 plus the width n of the slot 5. The rail longitudinal sides 3 are inclined with respect to the rail back 2 at an angle α which is less than 90°. In the embodiment, the angle α is between 70° and 85°. As a result, the fastening rail 1 widens from the rail lips 4 in the direction of the rail back 2.

The fastening rail 1 has a greatest width b on the rail longitudinal sides 3. In the embodiment, the width of the fastening rail 1 decreases continuously from the greatest width b on the rail longitudinal sides 3. The smallest width c is measured on the rail lips 4 at the transition from the rail lips 4 into the rounding 32. The greatest width b, in this case, is measured at the transition from the rail longitudinal sides 3 into a rounding 33. The rail longitudinal sides 3 merge into the rail back 2 with the rounding 33. The rail longitudinal sides 3 extend in a planar manner in the embodiment between the rounding 32 and the rounding 33.

The fastening rail 1 has a portion 29 in which the fastening rail 1 forms an undercut. The width of the fastening rail decreases in the portion 29 from the greatest width b to the width c on the rail lips 4. In the portion 29, the greatest width b of the fastening rail 1, in this case, is at least 1.1 times, in particular at least 1.2 times the smallest width c.

The fastening rail 1 has a height a which is measured perpendicularly to the outside 9 of the rail lips 4. In the embodiment, the width b corresponds to the overall width of the fastening rail 1. The overall width b of the fastening rail 1 is advantageously greater than the height a of the fastening rail 1. In an advantageous manner, the overall width b of the fastening rail 1 is less than double the height a. In an advantageous manner, the overall width b of the fastening rail 1 is between 1.4 times and 1.8 times, in particular between 1.5 times and 1.7 times the height a. As a result, a sufficient undercut is achieved on the rail longitudinal sides 3 at a comparatively large angle α. It is possible to place the fastening rail 1 in position in a simple manner independently of any armoring to be arranged in a concrete element as a result of the not too large height a of the fastening rail 1.

The fastening rail 1 has a wall thickness e. The wall thickness e is measured on the rail back 2. In an advantageous manner, the wall thickness e on the rail longitudinal sides 3 and on the rail lips 4 is the same size as on the rail back 2. The wall thickness e is constant—with the exception of the indentations 13 and of the elevations of the second profiling 14. The wall thickness e of the fastening rail 1 is advantageously between 1.2 mm and 3.0 mm. As a result, a sufficient, large degree of stability of the fastening rail 1 is achieved such that large forces are able to be introduced into the fastening rail 1.

As is also shown in FIG. 2, the rail back 2 has an inside 11 which lies facing the rail interior 31. The inside 11 of the rail back 2 is realized in a smooth and planar manner and without profiling or structure. The inside 11 of the rail back 2 and insides 37 of the rail longitudinal sides 3 form an inside surface 36 of the fastening rail which lies remote from the outside surface 35. The inside surface 36 and the outside surface 35 are oppositely situated sides of the same portion of the metal plate, by means of which the fastening rail 1 is formed. Neither the rail back 2, nor the rail longitudinal sides 3 nor the rail lips 4 include any breakthroughs which extend over the entire wall thickness e. Neither do the rail longitudinal sides 3 nor the rail lips 4 have any breakthroughs which connect the rail interior 31 to the surrounding area on the outside 8 or 9. The rail interior 31 is only connected to the surrounding area via the slot 5 and the end faces of the fastening rail 1.

Figure 3:
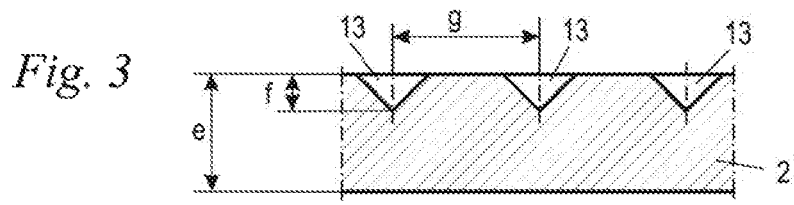
FIG. 3 shows a detail in an enlarged sectional representation through the rail back of the fastening rail.

FIG. 3 shows the configuration of the indentations 13 of the profiling 12 in detail. As shown in FIG. 3, the indentations 13 have a triangular cross section. As shown in FIG. 3 in conjunction with FIG. 4, the indentations 13 are realized in the form of pyramid-shaped depressions. As shown in FIG. 3, there is a center-to-center distance g between adjacent indentations 13. In the embodiment, the center-to-center distance g is approximately the same size as the wall thickness e. The center-to-center distance g can be advantageously between 0.1 times and 5 times the wall thickness e. The indentations 13 have a depth f which is smaller than the wall thickness e. The depth f is advantageously no more than 70%, in particular no more than 50%, in a preferred manner no more than 40% of the wall thickness e. As a result of a comparatively small depth f of the indentations 13, they are able to be produced simply in a rolling method. The center-to-center distance g is advantageously greater than the depth f of the indentations. In an advantageous manner, the ratio of the center-to-center distance of adjacent indentations to the depth of the indentations is between 2 and 6.

Figure 4:
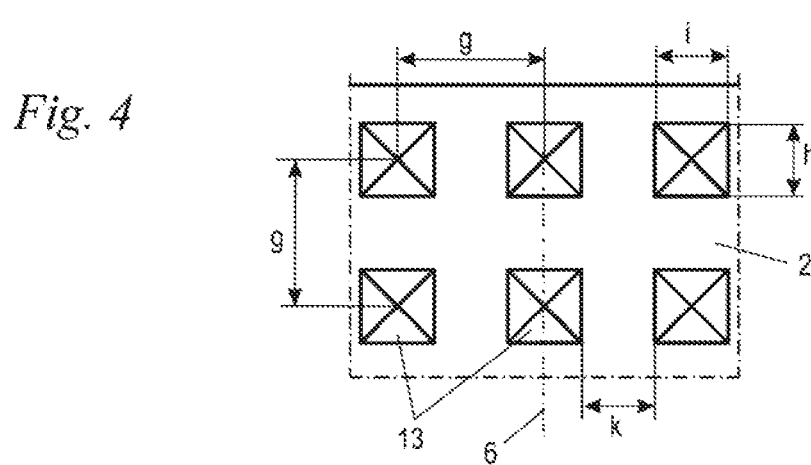
FIG. 4 shows a detail in an enlarged top view of the rail back of the fastening rail.

As shown in FIG. 4, the indentations 13 have a height h which is measured in the rail longitudinal direction 6 and a width i which is measured perpendicularly to the rail longitudinal direction 6. In the embodiment, the height h and the width i are the same size. However, different measurements for the width i and the height h can be advantageous. As is also shown in FIG. 4, the center-to-center distance g in the rail longitudinal direction 6 is the same size as the center-to-center distance g perpendicular to the rail longitudinal direction 6. The indentations 13 are accordingly arranged in a regular manner in the transverse direction and in the rail longitudinal direction 6 of the fastening rail 1. As is also shown in FIG. 4, adjacent indentations 13 are at a distance k to one another. The distance k is advantageously smaller than the wall thickness e of the fastening rail 1 on the rail back 2.

Instead of the indentations 13, other forms of indentations can also be advantageous for forming a profiling 12. The profiling 12 can also be formed, for example, by knurling or a different surface structuring. The profiling 12 can also be formed by elevations such as, for example, nubs or the like. In an advantageous manner, the height of the elevations is less than 70%, in particular less than 50%, advantageously less than 40% of the wall thickness e. It can also be provided that the profiling 12 is achieved by increased roughness of the surface of the fastening rail 1. If the profiling 12 is formed by increased roughness of the outside 7 of the rail back 2 and of the outside 8 of the rail longitudinal sides 3, the average roughness depth advantageously corresponds to the values given for the depth f of the indentations 13.

Figure 5:
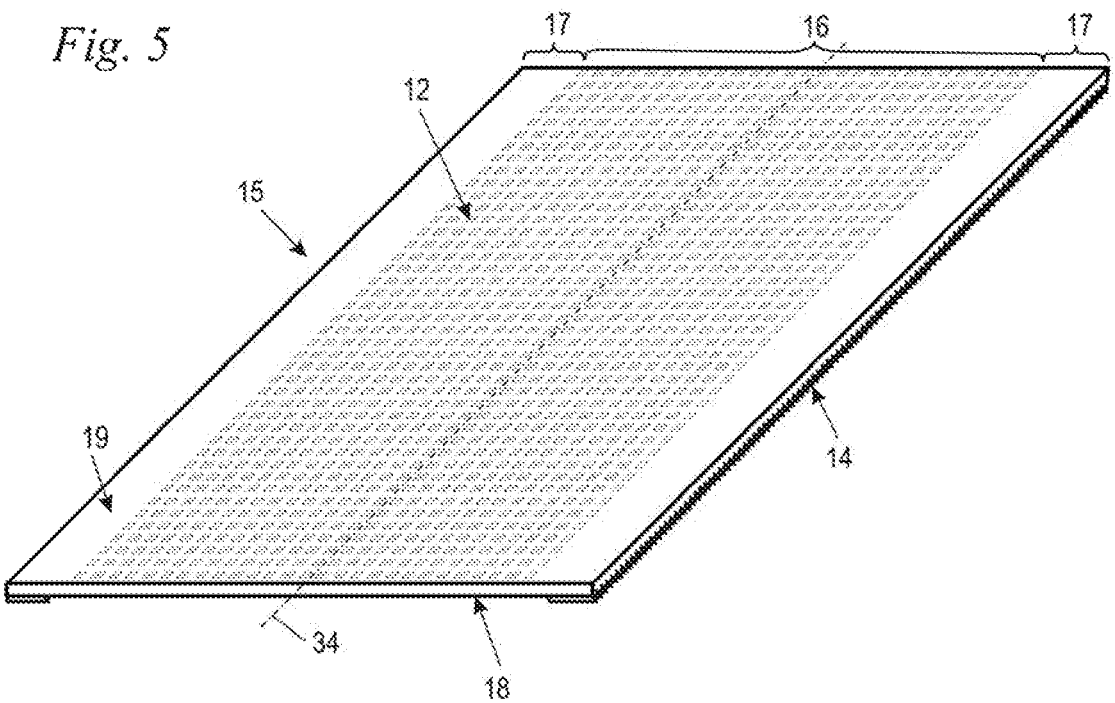
FIG. 5 shows a metal plate blank after producing profilings and prior to the re-shaping process to form a fastening rail; and, FIG. 6 shows a schematic sectional representation through a concrete element with a fastening rail embedded therein.

FIG. 5 shows a metal plate blank 15, from which the fastening rail 1 can be formed. The metal plate blank 15 has a longitudinal direction 34 which extends parallel to the rail longitudinal direction 6 once the metal plate blank 15 has been re-shaped to form the fastening rail 1. The metal plate blank 15 has a center region 16 which extends in the longitudinal direction 34. Edge regions 17 are formed on both sides of the center region 16. The metal plate blank 15 has an underside 18 and a top side 19. The designations "top side" and "underside" relate to the position shown in FIG. 5 and are fully independent of the position of the metal plate blank 15 in the production process. The underside 18, after the re-shaping process, forms the inside of the fastening rail 1, and the top side 19 forms the outside. The metal plate blank 15 includes the profiling 12 in the center region 16 on the top side 19. The center region 16 is realized in a planar and smooth manner on the underside 18. The edge regions 17 include the second profiling 14 on the underside 18. The edge regions 17 are realized in a smooth and planar manner on the top side 19.

In the case of a method for producing a fastening rail 1, a metal plate blank 15, which can also be present, for example, as strip stock, can first of all be provided with the profilings 12 and 14. The metal plate blank 15 is then re-shaped, in particular in a cold rolling method. In this case, the center region 16 is bent to the underside 18 parallel to the longitudinal direction 34 in order to form the rail longitudinal sides 3. The metal plate blank 15 is additionally bent around between the center region 16 and the edge regions 17 in order to form the rail lips 4. The sequence of the bending steps is advantageously chosen in a suitable manner.

FIG. 6 shows a schematic representation of the fastening rail 1 in a concrete element 20. The fastening rail 1 is embedded into the concrete element 20, namely is encased in concrete in the concrete element. As is shown schematically in FIG. 6, the concrete element 20 has armoring 30 which can be realized in an arbitrary known manner. The armoring 30 is at a distance m from a surface 21 of the concrete element 20. The distance m is greater than the height a of the fastening rail 1. The height a and the distance m are measured, in this case, perpendicularly to the surface 21. As a result, the fastening rail 1 does not reach into the armoring 30 with any region such that the position of the fastening rail 1 is able to be chosen independently of the armoring 30.

The outsides 9 of the rail lips 4 are located flush with the surface 21 of the concrete element 20. The outside surface 35 is in contact with the surrounding concrete of the concrete element 20. A fastening screw 24 is secured to the fastening rail 1. The fastening screw 24 has a head 26 which is arranged in the rail interior 31. The head 26 has an underside 27 which is provided with a profiling 28. The profiling 28 engages in the profiling 14 on the inside of the rail lips 4. The geometry of the profiling 28 is advantageously matched to the geometry of the profiling 14. The profilings 14 and 28 can be, for example, meshing teeth. The head 26 is held in a positive locking manner on the fastening rail 1, advantageously in the rail longitudinal direction 6, by the profilings 14 and 28. As a result, high forces are able to be transmitted in the rail longitudinal direction 6.

A component 22, which is to be fastened on the fastening rail 1 or on the concrete element 20, is arranged on the outside 9 of the rail lips 4. A nut 25, which presses the component 22 against the rail lips 4, is screw-connected to the fastening screw 24. In the embodiment, a shim 23 is arranged between the nut 25 and the component 22. A different arrangement and a different configuration of a fastening element can also be advantageous.

In the embodiment, the profiling 12 extends over the entire outside surface 35. It can be provided in an advantageous alternative configuration that the profiling 12 only extends over part of the outside surface 35. The profiling 12 is arranged continuously in an advantageous manner in the rail longitudinal direction 6. In an advantageous configuration, the profiling extends at least in part over the outside 7 of the rail back 2. As an alternative to this or in addition to it, it is provided that the profiling extends at least in part over the outside 8 of at least one rail longitudinal side 3, in particular over the outsides 8 of both rail longitudinal sides 3.

It is understood that the foregoing description is that of the preferred embodiments of the invention and that various changes and modifications may be made thereto without departing from the spirit and scope of the invention as defined in the appended claims.

What is claimed is:

1. A fastening rail for embedding in a concrete element, the fastening rail comprising:

a fastening rail body defining a rail longitudinal direction;

said fastening rail body having one rail back, two rail lips and two rail longitudinal sides disposed opposite one another and extending in the rail longitudinal direction;

said rail longitudinal sides each having a first side facing away from said rail back;

each of said rail lips extending on said first side of said rail longitudinal sides and projecting toward one another from corresponding ones of said rail longitudinal sides;

said rail lips delimiting a slot between each other;

said rail lips having a rail lip outside which faces away from said rail back;

the fastening rail being configured in an anchorless manner;

said fastening rail body forming at least one undercut from said rail back in the direction of said rail lip outside;

said rail longitudinal sides each having a longitudinal outside;

said rail back having a rail back outside which faces away from said rail lips;

said fastening rail body having an outside surface which is formed by said rail back outside of said rail back and said longitudinal outsides of said rail longitudinal sides;

said outside surface being provided for contact with the concrete of the concrete element;

said outside surface being provided at least in part with a profiling;

said profiling being formed by a plurality of indentations in said outside surface;

adjacent ones of said indentations defining a center-to-center distance (g);

said indentations having a depth (f); and, a ratio of said center-to-center distance (g) of adjacent indentations to said depth (f) of the indentations being between 2 and 6.

2. The fastening rail of claim 1, wherein:
said fastening rail body has a wall thickness (e);
said profiling has a depth (f); and,
said depth (f) is no more than 70% of said wall thickness (e).

3. The fastening rail of claim 1, wherein:
said fastening rail body has an inside surface facing away from said outside surface; and,
said inside surface is formed as a planar surface.

4. The fastening rail of claim 1, wherein said profiling of the fastening rail extends continuously over said rail back outside and said longitudinal outsides.

5. The fastening rail of claim 1, wherein:
said rail lips each have rail lip insides; and,
said fastening rail body carries a second profiling on said rail lip insides.

6. The fastening rail of claim 1, wherein said undercut is formed by at least one of said rail longitudinal sides.

7. The fastening rail of claim 1, wherein:
said fastening rail body has a width (b, c) measured parallel to said rail lip outside and perpendicular to the rail longitudinal direction; and,
said undercut is formed as a result of said width (b, c) decreasing in at least one portion from said rail back in the direction of said rail lip outside.

8. The fastening rail of claim 7, wherein a greatest width (b) of said fastening rail body in said portion is at least 1.1 times the smallest width (c).

9. The fastening rail of claim 7, wherein a greatest width (b) of said fastening rail body in said portion is at least 1.2 times the smallest width (c).

10. The fastening rail of claim 1, wherein:
said fastening rail body has a height (a); and,
said fastening rail body has an overall width (b); and,
said overall width (b) is between 1.4 times and 1.8 times the height (a).

11. The fastening rail of claim 1, wherein the fastening rail is formed by a one-part curved metal plate.

12. The fastening rail of claim 1, wherein:
said fastening rail body has a wall thickness (e); and,
said wall thickness (e) is between 1.2 mm and 3.0 mm at least at said rail back.

13. The fastening rail of claim 1, wherein:
said fastening rail body has a wall thickness (e);
said fastening rail body has an overall width (b); and,
a ratio of said wall thickness (e) to said overall width (b) is between 0.03 and 0.08.

* * * * *